United States Patent
Leckenby

(10) Patent No.: US 11,372,440 B2
(45) Date of Patent: Jun. 28, 2022

(54) SINGLE AXIS JOYSTICK

(71) Applicant: Sure Grip Controls, Inc., Saanichton (CA)

(72) Inventor: Stephen L. Leckenby, Victoria (CA)

(73) Assignee: SURE GRIP CONTROLS, INC., Saanichton (CA)

(*) Notice: Subject to any disclaimer, the term of this patent is extended or adjusted under 35 U.S.C. 154(b) by 239 days.

(21) Appl. No.: 15/929,290

(22) Filed: Apr. 23, 2020

(65) Prior Publication Data
US 2021/0333817 A1     Oct. 28, 2021

(51) Int. Cl.
*G05G 9/047*     (2006.01)
*G06F 3/0338*    (2013.01)

(52) U.S. Cl.
CPC ........... *G05G 9/047* (2013.01); *G06F 3/0338* (2013.01); *G05G 2009/04703* (2013.01); *G05G 2009/04774* (2013.01)

(58) Field of Classification Search
CPC ......... G05G 9/047; G05G 2009/04703; G05G 2009/04774; G05G 2009/04766; G05G 2009/0477; G05G 5/05; G06F 3/0338; F16H 2059/0295
See application file for complete search history.

(56) References Cited

U.S. PATENT DOCUMENTS

| | | |
|---|---|---|
| 4,688,444 A | 8/1987 | Nordstrom |
| 5,553,684 A | 9/1996 | Bolduc |
| 6,070,487 A * | 6/2000 | Beugelsdyk ............... F16C 1/18 74/502.2 |
| 6,106,193 A | 8/2000 | Allen et al. |
| 6,250,844 B1 | 6/2001 | Sartler et al. |
| 6,865,996 B2 | 3/2005 | Borrett |
| 7,503,173 B2 | 3/2009 | Dong et al. |
| 7,559,733 B2 | 7/2009 | Khan et al. |
| 8,425,382 B2 | 4/2013 | Bennett |
| 8,449,569 B2 | 5/2013 | Espinal |
| 9,178,340 B2 | 11/2015 | Johnson et al. |
| 9,840,826 B2 | 12/2017 | Huber et al. |
| 10,065,843 B2 | 9/2018 | Ahern et al. |
| 10,130,876 B2 | 11/2018 | Huang et al. |
| 2004/0227727 A1* | 11/2004 | Schena ............... G05G 9/047 345/156 |

(Continued)

FOREIGN PATENT DOCUMENTS

CN   209231808 U   8/2019
DE   202006016583 U1   1/2007

(Continued)

*Primary Examiner* — Daniel D Yabut
(74) *Attorney, Agent, or Firm* — Luedeka Neely Group, P.C.; Rick Barnes

(57) ABSTRACT

A joystick with a first casing that has a piece of a sensor/effector pair. A second section is attached to the first casing, where at least one of the first and second casings form a void within the first and second casings. A puck with a cylindrical shape is disposed within the void, where the puck has a piece of the sensor/effector pair. A shaft is connected to the puck, with a distal end free to move, thereby rotating the puck. The shaft passes through a void between the first and second casings, and as the shaft is moved and the puck rotates, an interaction between the pieces of the sensor/effector pair produces a signal indicating a degree of movement of the shaft.

17 Claims, 3 Drawing Sheets

(56) References Cited

U.S. PATENT DOCUMENTS

| | | |
|---|---|---|
| 2005/0274563 A1 | 12/2005 | Ahnafield |
| 2006/0229163 A1 | 10/2006 | Waters |
| 2007/0199762 A1 | 8/2007 | Barnard |
| 2009/0098980 A1 | 4/2009 | Waters |
| 2009/0301375 A1 | 12/2009 | Borrett et al. |
| 2010/0121189 A1 | 5/2010 | Ma et al. |
| 2010/0254763 A1 | 10/2010 | Grahl |
| 2014/0102241 A1 | 4/2014 | Rao et al. |
| 2016/0375975 A1 | 12/2016 | Fell |
| 2018/0192854 A1 | 7/2018 | Hata et al. |
| 2018/0243903 A1 | 8/2018 | Passot et al. |
| 2018/0339588 A1* | 11/2018 | Henquez ................. F02D 11/02 |
| 2019/0248510 A1 | 8/2019 | Williamson et al. |

FOREIGN PATENT DOCUMENTS

| | | |
|---|---|---|
| DE | 102016208537 A1 * | 11/2017 |
| EP | 3264217 A3 | 8/2018 |

* cited by examiner

SINGLE AXIS JOYSTICK

FIELD

This invention relates to the field of joysticks. More particularly, this invention relates to a single axis joystick.

INTRODUCTION

Joysticks are in common use throughout a variety of different fields. A typical joystick provides an operator with the ability to control the movement of a connected object, be that object physical or virtual. For example, a joystick can be configured to move the hydraulic arm of a backhoe or a character in a video game. Some joysticks enable motion of the connected object in three dimensions, some in two dimensions, and some in one dimension. This disclosure predominantly pertains to single-dimension joysticks.

Most joysticks have a mechanical component—the operator controls the joystick by physically moving some mechanical element of the joystick. This physical movement within the joystick tends to lead to mechanical degradation of one or more parts of the joystick, which tends to be a major mode of failure of joysticks.

Similarly, most joysticks also have an electronic component—once the operator physically moves an element of the joystick, that movement is electronically sensed and relayed to other components. The electronic sensing of the mechanical movement is often performed at close proximity to the mechanically moving elements, which tends to introduce challenges into the design of the joystick.

What is needed, therefore, is a design for a joystick that tends to reduce, at least in part, issues such as those described above.

SUMMARY

The above and other needs are met by a joystick with a first casing section that has a first piece only of a sensor/effector pair having two pieces. A second casing section is attached to the first casing section, where at least one of the first and second casing sections form a cylindrical void within the first and second casing sections. A puck with a cylindrical shape is disposed within the cylindrical void, where the puck has a second piece only of the sensor/effector pair. A shaft is connected to the puck by a first end, with a distal second end free to move in a first dimension, thereby rotating the puck within the first and second casing sections. The shaft passes through a first void formed between the first and second casing sections, and as the shaft is moved in the first dimension and the puck rotates, an interaction between the first and second pieces of the sensor/effector pair produces a signal indicating a degree of movement of the shaft.

In various embodiments according to this aspect of the invention, the sensor/effector pair is a magnet and a Hall sensor. In some embodiments, the sensor/effector pair comprises an alignment marking and an optical sensor. In some embodiments, the sensor/effector pair comprises a surface and a roller. In some embodiments, an interior of the puck is substantially hollow. In some embodiments, electrical wires are disposed in the puck, with a first wire connected to a control element disposed near the second end of the shaft, and a second wire connected to the second piece of the sensor/effector pair in the puck, and at least one of the first and second wires exiting the puck through a second void formed between the first and second casing sections.

In some embodiments, a first portion of a positioning mechanism disposed is on the second casing section and a second portion of the positioning mechanism is disposed on the puck, wherein the positioning mechanism tends to releasably retain the puck in a desired position with respect to the second casing section. In some embodiments, the positioning mechanism includes a spring-loaded ball and a detent that releasably engage one another. In some embodiments, the positioning mechanism includes a leaf spring and a surface that releasably engage one another. In some embodiments, the positioning mechanism tends to releasably retain the puck in a centered position with respect to the second casing section.

According to another aspect of the invention there is described a joystick that has a first casing section with a first piece only of a sensor/effector pair having two pieces, which are a magnet and a Hall sensor. A second casing section has a first portion of a positioning mechanism, and is attached to the second casing section. At least one of the first and second casing sections form a cylindrical void within the first and second casing sections. A puck with a cylindrical shape is disposed within the cylindrical void, where the puck has a second piece only of the sensor/effector pair, and a second portion of the positioning mechanism. The positioning mechanism tends to releasably retain the puck in a desired position with respect to the second casing section. A shaft is connected to the puck by a first end, and a distal second end is free to move in a first dimension, thereby rotating the puck within the first and second casing sections. The shaft passes through a first void formed between the first and second casing sections. When the shaft is moved in the first dimension and the puck rotates, an interaction between the first and second pieces of the sensor/effector pair produces a signal indicating a degree of movement of the shaft.

In various embodiment according to this aspect of the invention, an interior of the puck is substantially hollow. In some embodiments, electrical wires are disposed in the puck, including a first wire that is connected to a control element disposed near the second end of the shaft, and a second wire that is connected to the second piece of the sensor/effector pair in the puck, where at least one of the first and second wires exit the puck through a second void formed between the first and second casing sections. In some embodiments, the positioning mechanism includes a spring-loaded ball and a detent that releasably engage one another. In some embodiments, the positioning mechanism includes a leaf spring and a surface that releasably engage one another. In some embodiments, the positioning mechanism tends to releasably retain the puck in a centered position with respect to the second casing section.

According to yet another aspect of the invention there is described a joystick that has a first casing section with a first piece only of a sensor/effector pair having two pieces, which are a magnet and a Hall sensor. A second casing section has a first portion of a positioning mechanism, including a spring-loaded ball and a leaf spring. The first casing section is attached to the second casing section, where at least one of the first and second casing sections forms a cylindrical void within the first and second casing sections. A puck with a cylindrical shape is disposed within the cylindrical void. The puck has a second piece only of the sensor/effector pair, and a second portion of the positioning mechanism, including a detent and a surface. The spring-loaded ball and the detent releasably engage one another, and the leaf spring and the surface releasably engage one another. The centering mechanism tends to releasably retain the puck in a desired position with respect to the second casing section. A shaft is connected by a first end to the puck, and a distal second end is free to move in a first dimension, thereby rotating the puck within the first and second casing sections. The shaft passes through a first void formed between the first and second casing sections. When the shaft is moved in the first dimension and the puck rotates, an interaction between the first and second pieces of the sensor/effector pair produces a signal indicating a degree of movement of the shaft.

In some embodiments according to this aspect of the invention, an interior of the puck is substantially hollow. In some embodiments, electrical wires are disposed in the puck, including a first wire that is connected to a control element that is disposed near the second end of the shaft, and a second wire that is connected to the second piece of the sensor/effector pair in the puck, where at least one of the first and second wires exit the puck through a second void formed between the first and second casing sections. In some embodiments, the positioning mechanism tends to releasably retain the puck in a centered position with respect to the second casing section.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
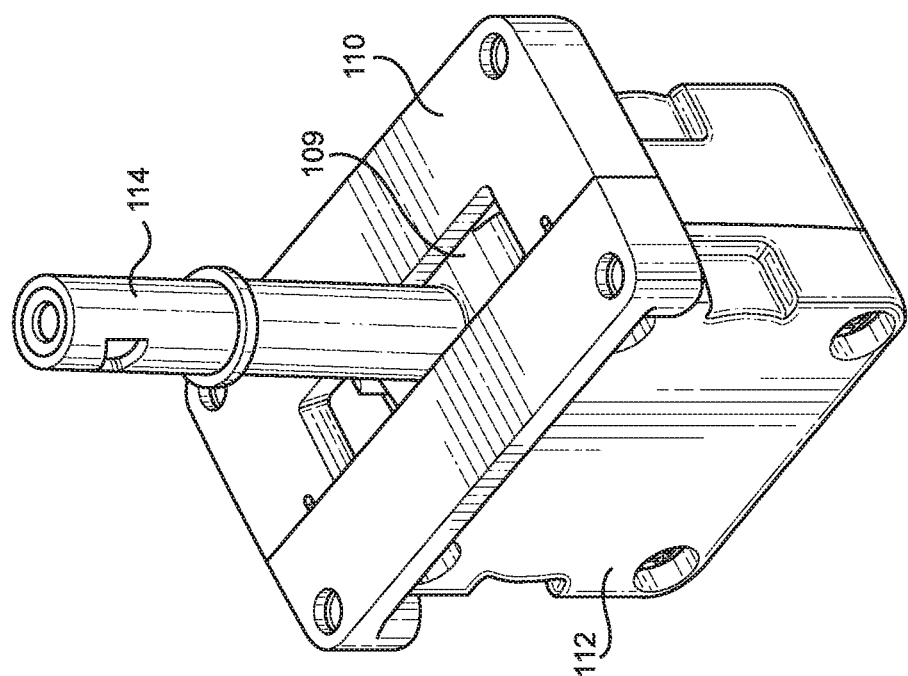
FIG. 1 is an external perspective view of a joystick according to an embodiment of the present invention.

With reference now to FIG. 1, there is depicted a joystick 100, which in the embodiments depicted in the figures is a single-axis joystick 100, meaning that the joystick 100 moves in one dimension. In various embodiments, the joystick 100 includes a handle 102 of some type, such as can be grasped by an operator, and some type of control element 104, such as an electrical switch or button. A pliable boot 106 is attached to a top plate 108 of the joystick 100 casing, so as to allow movement of portions of the joystick 100 while preventing debris from entering the moving portions inside the joystick 100. In the embodiment depicted, the casing of the joystick 100 is formed substantially of two sections, being a first section 112 and a second section 110.

Figure 2:
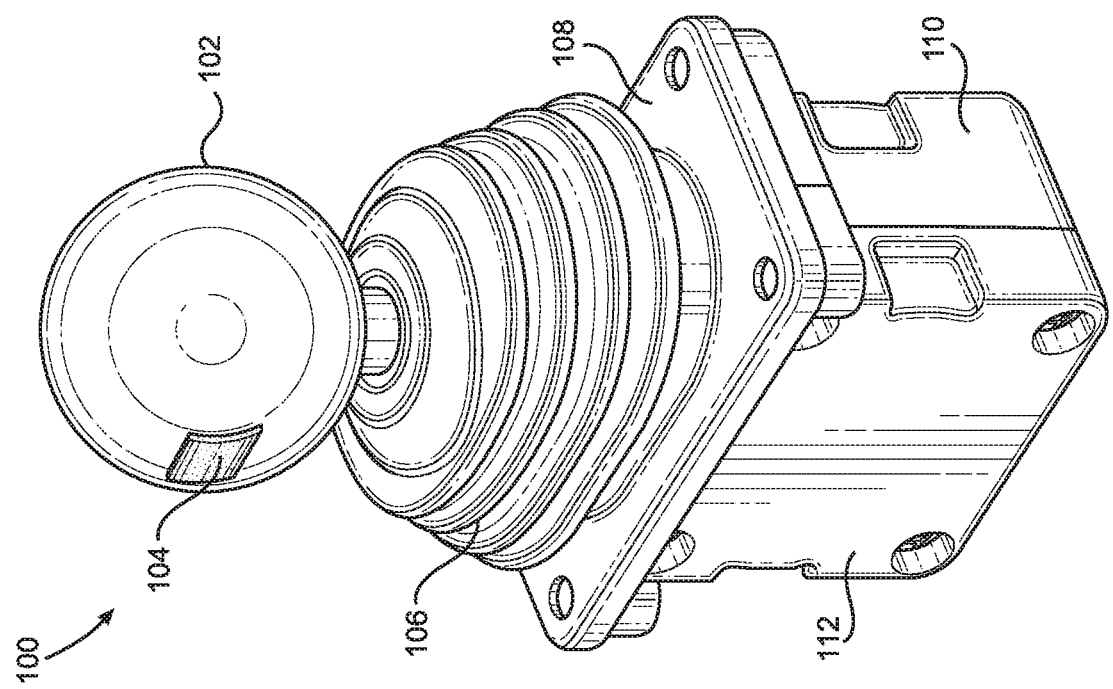
FIG. 2 is a partially-dissembled perspective view of a joystick according to an embodiment of the present invention.

As depicted in FIG. 2, the handle 102 has been removed from the joystick 100, as well as the boot 106 and the top plate 108. In this configuration, a shaft 114 is visible, which passes into the casing through a first void 109, which is formed between the first section 112 and the second section 110 of the casing.

Figure 3:
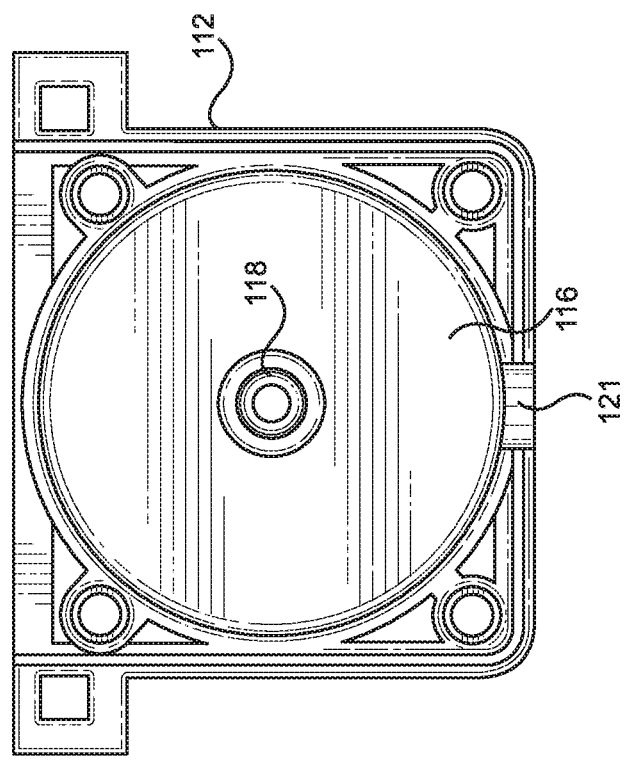
FIG. 3 is a top plan view of a first portion of a casing of a joystick according to an embodiment of the present invention.

With reference now to FIG. 3, there is depicted an interior top plan view of the first section 112 of the casing, which has been removed from the second section 110 of the casing. As depicted in this embodiment, a portion of a cylindrical void 116 is formed in the interior of the first section 112. Disposed within the portion of the cylindrical void 116 in the first section 112 is a first piece 118 of a sensor/effector pair.

Figure 4:
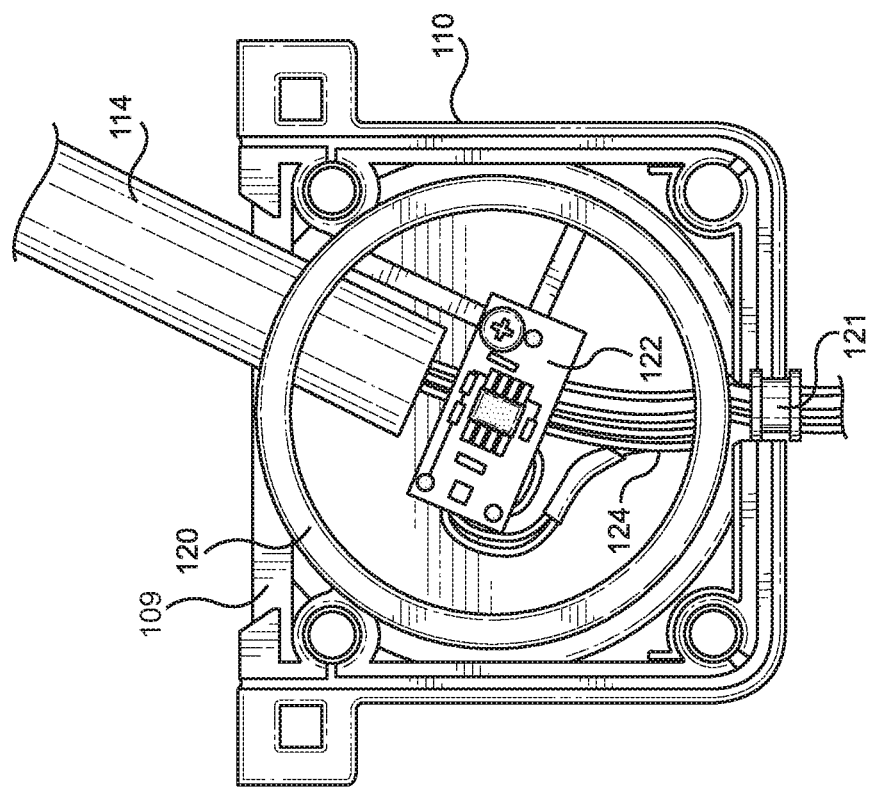
FIG. 4 is a top plan view of a first side of a puck of a joystick according to an embodiment of the present invention.

FIG. 4 depicts the first side of a puck 120, disposed with the second portion of the void 116 in the second section 110 of the casing. The second piece 122 of the sensor/effector pair is attached to the puck 120. As depicted in the figures, the cylindrical void 116 is partially formed in each of the first section 112 and the second section 110. In various embodiments, however, the void 116 could be substantially formed in one or another of the first section 112 and the second section 110. Regardless of the degree of formation of the cylindrical void 116 between the first section 112 and the second section 110, the puck 120 is able to rotate within the cylindrical void 116 in one dimension only, as acted upon by the movement of the shaft 114.

In various embodiments, the puck 120 is formed as a substantially hollow cylinder, with open ends and, in some embodiments, some type of structure on the inside of the cylinder. For example, the structure could be a plate that is disposed cross-sectionally to the general cylindrical shape of the puck 120, which plate could be disposed centrally along the depth of the cylindrical shape of the puck 120, or nearer to one end of the puck 120 than the other. In some embodiments, voids are formed in portions of the plate. In other embodiments the structure could be one or more spokes that extend partially or fully across a diameter of the cylindrical shape of the puck 120.

Disposed within the puck 120 is a second piece 122 of the sensor/effector pair. The two pieces 118 and 122 of the sensor/effector pair are positioned in the first section 112 and the puck 120, respectively, such that they are adjacent one another when the first section 112 and the second section 110 of the casing are put together. In the embodiment as depicted in the figures, this position is a center of rotation of the puck 120. However, in other embodiments the position might be radially outward from the center, or even on a peripheral surface of the puck 120 and the first section 112. Such variations in the positions of the first piece 118 and the second piece 122 are dependent, at least in part, upon the type of sensor/effector pair that is used.

In various embodiments, the sensor/effector pair is a magnet and Hall sensor, where the rotation of the magnetic field relative to the Hall sensor can be detected by the Hall sensor and interpreted as to the degree of rotation. In other embodiments, the sensor/effector pair is an alignment marking and an optical sensor that reads the relative movement of the alignment marking and interprets the degree of rotation. In yet another embodiment, the sensor/effector pair is a surface and a roller that engages the surface, which roller is read with an electronic or mechanical means to determine the relative degree of rotation. In various embodiment, either one or the other of the two pieces of the sensor/effector pair can be on either one of the first section 112 or the puck 120.

In the embodiment as depicted, a permanent magnet 118 is disposed substantially in the radial center of a portion of the cylindrical void 116 in the first section 112 of the casing, and a Hall sensor 122 is disposed substantially in the radial center of the puck 120, such that when the first section 112 of the casing is connected to the second section 110 of the casing, the magnet 118 is disposed in close proximity to the Hall sensor 122, and any forward or backward movement of the shaft 114 will cause the puck 120 to rotate, and produce relative rotational movement between the magnet 118 and the Hall sensor 122, which can be electronically read by the Hall sensor 122, and a signal can be provided.

In that regard, signals from the second piece 122 of the sensor/effector pair can be routed along one or more wires 124, and exit the joystick 100 through a second void 121 formed in either one of or between both of the first section 112 and the second section 110 of the casing. Signals from the control element 104 can also be routed through wires 124 down through the shaft 114 and into the central portion of the puck 120, and then routed out of the puck 120 and the joystick 100 through the second void 121.

Figure 6:
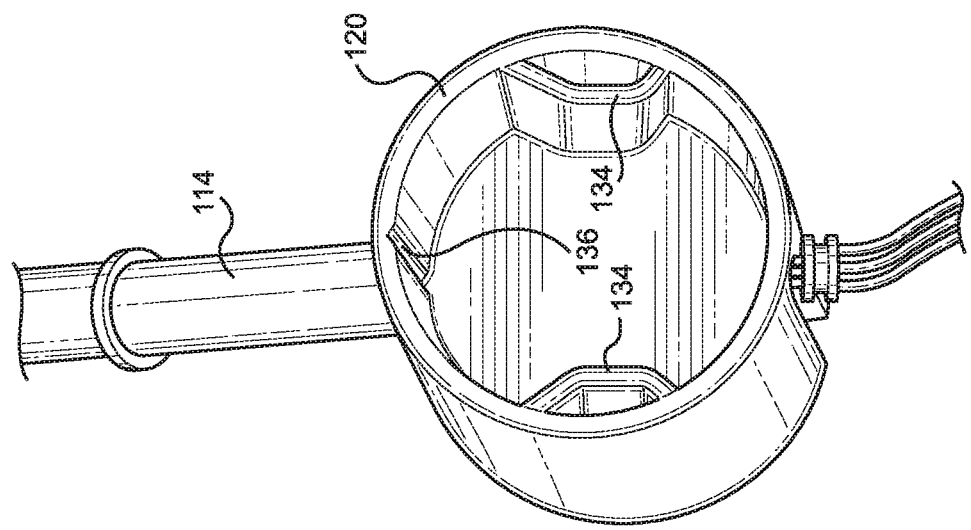
FIG. 6 is a perspective view of a second side of a puck of a joystick according to an embodiment of the present invention.
Figure 5:
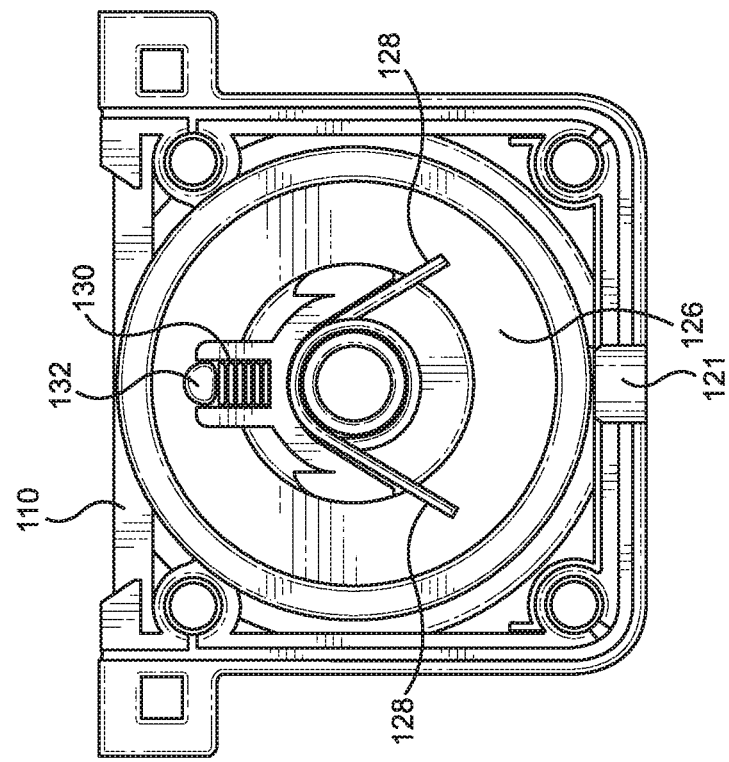
FIG. 5 is a top plan view of a second portion of a casing of a joystick according to an embodiment of the present invention.

With reference now to FIG. 5, there is depicted the second section 110 of the joystick 100, such as in the orientation as depicted in FIG. 4, but with the assembly of the puck 120 and the shaft 114 removed and turned over, as depicted in FIG. 6. Thus, FIG. 5 depicts the interior top plan view of the second section 110, and FIG. 6 depicts the second side of the puck 120 which, when the joystick 100 is assembled, is disposed so as to be facing the interior of the second section 110 of the casing of the joystick 100.

FIGS. 5 and 6 depict various portions and embodiments of positioning mechanisms, where the positioning mechanism tends to releasably retain the puck 120 in a desired position with respect to the second casing section 120. In some embodiments, the positioning mechanism releasably retains the puck 120 and the shaft 114 in a substantially centered position (equidistant between the two ends of the first void 109) with respect to the second casing section 120. Although two different types of positioning mechanisms are depicted in FIGS. 5 and 6, it is appreciated that a greater or lesser number of positioning mechanisms could be used in various embodiments, and that other types of positioning mechanisms could be used. Further, the different parts of the positioning mechanisms could be disposed on the second section 110 and the puck 120 differently from that as depicted.

As depicted in FIGS. 5 and 6, one of the positioning mechanisms is a ball 132 and spring 130 disposed on one element, and a detent 136 disposed on the other element, into which detent 136 the ball 132 is pushed by the spring 130. Thus, when the puck 120 is rotated into a desired position where the ball 132 and detent 136 engage, the pressure of the spring 130 tends to keep the puck 120 in that position, albeit with a degree of force that is relatively easy for an operator of the joystick to overcome when so desired.

Another of the positioning mechanisms is a leaf spring 128 disposed on one element, and surfaces 134 disposed on the other element, where the ends of the leaf spring 128 are flexed to greater or lesser degrees depending upon the position of the surfaces 134 against which they are pressing, as determined by the rotation of the puck 120. Thus, when an operator releases the handle 102, or otherwise sufficiently relaxes his grip on the joystick 100, the flexing of the leaf springs 128 will tend to rotate the puck 120 so as to reduce the total amount of force exerted between the leave springs 128 and the surfaces 134, or in some embodiments, to balance the forces exerted between the two leaf springs 128 and the two surfaces 134. Thus, in various embodiments, one or more positioning mechanisms can be used to both return the puck 120 and shaft 114 to a desired position and then help retain the puck 120 and shaft 114 in the desired position, relative to the second section 110 of the casing.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A joystick, comprising:
   a first casing section having a first piece only of a sensor/effector pair having two pieces,
   a second casing section,
   the first casing section attached to the second casing section, where at least one of the first and second casing sections form a cylindrical void within the first and second casing sections,
   a puck having a cylindrical shape, the puck disposed within the cylindrical void, the puck having a second piece only of the sensor/effector pair,
   a shaft having a first end connected to the puck and a distal second end free to move in a first dimension and thereby rotating the puck within the first and second casing sections, the shaft passing through a first void formed between the first and second casing sections, and
   electrical wires in the puck, a first wire connected to a control element disposed near the second end of the shaft, and a second wire connected to the second piece of the sensor/effector pair in the puck, and at least one of the first and second wires exiting the puck through a second void formed between the first and second casing sections,
   wherein when the shaft is moved in the first dimension and the puck rotates, an interaction between the first and second pieces of the sensor/effector pair produces a signal indicating a degree of movement of the shaft.

2. The joystick of claim 1, wherein the sensor/effector pair comprises a magnet and a Hall sensor.

3. The joystick of claim 1, wherein the sensor/effector pair comprises an alignment marking and an optical sensor.

4. The joystick of claim 1, wherein the sensor/effector pair comprises a surface and a roller.

5. The joystick of claim 1, wherein an interior of the puck is substantially hollow.

6. The joystick of claim 1, further comprising a first portion of a positioning mechanism disposed on the second casing section and a second portion of the positioning mechanism disposed on the puck, wherein the positioning mechanism tends to releasably retain the puck in a desired position with respect to the second casing section.

7. The joystick of claim 6, wherein the positioning mechanism comprises a spring-loaded ball and a detent that releasably engage one another.

8. The joystick of claim 6, wherein the positioning mechanism comprises a leaf spring and a surface that releasably engage one another.

9. The joystick of claim 6, wherein the positioning mechanism tends to releasably retain the puck in a centered position with respect to the second casing section.

10. A joystick, comprising:
- a first casing section having a first piece only of a sensor/effector pair having two pieces, comprising a magnet and a Hall sensor,
- a second casing section having a first portion of a positioning mechanism,
- the first casing section attached to the second casing section, where at least one of the first and second casing sections form a cylindrical void within the first and second casing sections,
- a puck having a cylindrical shape, the puck disposed within the cylindrical void, the puck having a second piece only of the sensor/effector pair, and a second portion of the positioning mechanism, wherein the positioning mechanism tends to releasably retain the puck in a desired position with respect to the second casing section,
- a shaft having a first end connected to the puck and a distal second end free to move in a first dimension and thereby rotating the puck within the first and second casing sections, the shaft passing through a first void formed between the first and second casing sections, and
- electrical wires in the puck, a first wire connected to a control element disposed near the second end of the shaft, and a second wire connected to the second piece of the sensor/effector pair in the puck, and at least one of the first and second wires exiting the puck through a second void formed between the first and second casing sections,
- wherein when the shaft is moved in the first dimension and the puck rotates, an interaction between the first and second pieces of the sensor/effector pair produces a signal indicating a degree of movement of the shaft.

11. The joystick of claim 10, wherein an interior of the puck is substantially hollow.

12. The joystick of claim 10, wherein the positioning mechanism comprises a spring-loaded ball and a detent that releasably engage one another.

13. The joystick of claim 10, wherein the positioning mechanism comprises a leaf spring and a surface that releasably engage one another.

14. The joystick of claim 10, wherein the positioning mechanism tends to releasably retain the puck in a centered position with respect to the second casing section.

15. A joystick, comprising:
- a first casing section having a first piece only of a sensor/effector pair having two pieces, comprising a magnet and a Hall sensor,
- a second casing section having a first portion of a positioning mechanism, comprising a spring-loaded ball and a leaf spring,
- the first casing section attached to the second casing section, where at least one of the first and second casing sections form a cylindrical void within the first and second casing sections,
- a puck having a cylindrical shape, the puck disposed within the cylindrical void, the puck having a second piece only of the sensor/effector pair, and a second portion of the positioning mechanism, comprising a detent and a surface, wherein the spring-loaded ball and the detent releasably engage one another, and the leaf spring and the surface releasably engage one another, and the positioning mechanism tends to releasably retain the puck in a desired position with respect to the second casing section,
- a shaft having a first end connected to the puck and a distal second end free to move in a first dimension and thereby rotating the puck within the first and second casing sections, the shaft passing through a first void formed between the first and second casing sections, and
- electrical wires in the puck, a first wire connected to a control element disposed near the second end of the shaft, and a second wire connected to the second piece of the sensor/effector pair in the puck, and at least one of the first and second wires exiting the puck through a second void formed between the first and second casing sections,
- wherein when the shaft is moved in the first dimension and the puck rotates, an interaction between the first and second pieces of the sensor/effector pair produces a signal indicating a degree of movement of the shaft.

16. The joystick of claim 15, wherein an interior of the puck is substantially hollow.

17. The joystick of claim 15, wherein the positioning mechanism tends to releasably retain the puck in a centered position with respect to the second casing section.

* * * * *